(12) United States Patent
Chu et al.

(10) Patent No.: US 7,412,888 B2
(45) Date of Patent: Aug. 19, 2008

(54) ACCELEROMETER

(75) Inventors: Chia-Yi Chu, Taoyuan Hsien (TW);
Heng-Chung Chang, Taoyuan Hsien (TW); Chuan-Wei Wang, Taoyuan Hsien (TW); Chih-Ming Sun, Taoyuan Hsien (TW); Wei-Leun Fang, Taoyuan Hsien (TW); Shiang-Cheng Lu, Taoyuan Hsien (TW); Hsieh-Shen Hsieh, Taoyuan Hsien (TW); Horng-Jou Wang, Taoyuan Hsien (TW); Tai-Kang Shing, Taoyuan Hsien (TW); Huang-Kun Chen, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 11/591,617

(22) Filed: Nov. 2, 2006

(65) Prior Publication Data
US 2007/0144258 A1    Jun. 28, 2007

(30) Foreign Application Priority Data
Dec. 23, 2005    (TW) .............................. 94145986 A

(51) Int. Cl.
*G01P 15/125* (2006.01)
(52) U.S. Cl. .................................................. 73/514.32

(58) Field of Classification Search .............. 73/514.32, 73/514.36, 514.38, 514.16, 514.29, 504.04, 73/504.12, 504.14
See application file for complete search history.

(56) References Cited

U.S. PATENT DOCUMENTS

| | | | | |
|---|---|---|---|---|
| 5,894,091 A | * | 4/1999 | Kubota | 73/504.12 |
| 6,070,464 A | * | 6/2000 | Koury et al. | 73/514.32 |
| 6,223,598 B1 | * | 5/2001 | Judy | 73/514.32 |
| 6,591,678 B2 | * | 7/2003 | Sakai | 73/514.36 |
| 6,906,849 B1 | * | 6/2005 | Mi et al. | 359/291 |
| 6,990,864 B2 | * | 1/2006 | Sakai | 73/514.32 |
| 7,013,730 B2 | * | 3/2006 | Malametz | 73/514.36 |
| 7,036,372 B2 | * | 5/2006 | Chojnacki et al. | 73/504.12 |

* cited by examiner

*Primary Examiner*—Helen C. Kwok
(74) *Attorney, Agent, or Firm*—Birch, Stewart, Kolasch & Birch, LLP

(57) ABSTRACT

An accelerometer includes a fixing unit and a movable unit. The fixing unit has a plurality of first electrode parts and a plurality of second electrode parts. The movable unit is connected with the fixing unit and includes a body having an opening, a plurality of third electrode parts and a plurality of fourth electrode parts. The third electrode parts are disposed at an outer side of the body with respect to the first electrode parts, respectively. The fourth electrode parts are disposed at the inner side of the body in the opening, and are disposed respectively with respect to the second electrode parts, respectively.

17 Claims, 5 Drawing Sheets

ACCELEROMETER

CROSS REFERENCE TO RELATED APPLICATIONS

This Non-provisional application claims priority under 35 U.S.C. §119(a) on Patent Application No(s). 094145986 filed in Taiwan, Republic of China on Dec. 23, 2005, the entire contents of which are hereby incorporated by reference.

BACKGROUND OF THE INVENTION

1. Field of Invention

The invention relates to an accelerometer and, in particular to a capacitance accelerometer.

2. Related Art

An accelerometer is used to measure the acceleration caused by an external force. For example, it can be applied in a vehicle automatic safety system for collecting the information such as the kinetic energy of the vehicle or the external force applied on the vehicle. Due to the development of micro electromechanical system (MEMS), the semiconductor technology may integrate the mechanical devices and circuits to manufacture the accelerometer. The accelerometer manufactured by the semiconductor technology has the advantages of low cost, decreased size and weight, and enhanced reliability.

According to the different measuring methods, the accelerometers include the piezoresistive accelerometers, the capacitance accelerometers, and the piezoelectric accelerometers. Herein, the capacitance accelerometers calculate the acceleration according to the capacitance variation. Regarding to the structure, the capacitance accelerometer may provide an out-of plane measuring mechanism or an in plane measuring mechanism. The out-of plane measuring mechanism utilizes large area planer electrode plates for measuring, and the in plane measuring mechanism utilizes comb electrodes, which are arranged interdigitatedly, for measuring.

Hereinafter, a conventional capacitance accelerometer 1 using the in plane measuring mechanism will be described. As shown in FIG. 1, the conventional capacitance accelerometer 1 includes a proof mass 10, an elastic part 11, a first comb electrode 12, and a second comb electrode 13. The proof mass 10 is connected with a fixing block 14 by the elastic part 11. If there is no external force, the proof mass 10 stays at a static position. In this case, the first comb electrode 12 is connected with the proof mass 10, and the second comb electrode 13 is disposed with respect to the first comb electrode 12 and located at another fixing block 15. When the external force is applied, the proof mass 10 moves up and down along the direction of arrow D. In this case, the distance between the first comb electrode 12 and the second comb electrode 13 changes, and then the capacitance variation between the electrodes 12 and 13 is measured for estimating the corresponding acceleration.

To increase the sensitivity of the capacitance accelerometer 1, the numbers of the comb electrodes 12 and 13 are increased, or the distance between the first comb electrode 12 and the second comb electrode 13 is decreased. However, if the numbers of the comb electrodes 12 and 13 are increased, the entire area of the accelerometer 1 must be increased, which is undesired for the trend of product minimization. In addition, the present manufacturing machines have their limitations while decreasing the distance between the electrodes 12 and 13.

Therefore, it is an important subject of the invention to provide an accelerometer having high sensitivity and small size.

SUMMARY OF THE INVENTION

In view of the foregoing, the invention is to provide an accelerometer, which has high sensitivity and small size.

To achieve the above, the invention discloses an accelerometer including a fixing unit and a movable unit. In the invention, the fixing unit has a plurality of first electrode parts arranged in parallel and a plurality of second electrode parts arranged in parallel. The movable unit is connected with the fixing unit and has a body, a plurality of third electrode parts arranged in parallel and a plurality of fourth electrode parts arranged in parallel. The body has an opening located at the center thereof. The third electrode parts are located at an outer side of the body and are disposed respectively with respect to the first electrode parts. The fourth electrode parts are located at the inner side of the body in the opening corresponding to the outer side and are disposed respectively with respect to the second electrode parts.

To achieve the above, the invention also discloses an accelerometer including a fixing unit and a movable unit. In the invention, the fixing unit includes a substrate, a first conductive element, and a positioning structure. The first conductive element has a plurality of first electrode parts arranged in parallel. The first conductive element is fixed on the substrate by the positioning structure. The movable unit is connected with a fixing block and includes a body and a plurality of second electrode parts arranged in parallel. The second electrode parts are located at an outer side of the body and are disposed respectively with respect to the first electrode parts.

As mentioned above, the invention is to provide an opening on the body of the movable unit (the proof mass). The electrode parts may not only be disposed at the outer side of the body, but also be disposed at the inner side of the body in the opening corresponding to the outer side. Thus, the number of the electrode parts can be increased so as to enhance the sensitivity of the accelerometer. Compared to the prior art, the invention designs the opening for disposing the additional electrode parts, so that the accelerometer of the invention would not be manufactured against the trend of product minimization. In addition, the electrode parts of the fixing unit are disposed on one conductive element, which is connected with the substrate by the positioning structure, so the electrode parts of the fixing unit are disposed with respect to the electrode parts of the movable unit. In other words, each of the electrode parts of the fixing unit is disposed between two of the electrode parts of the movable unit, and the positioning structure of the invention can lead to the coupled electrode parts with smaller intervals. Accordingly, the distance limitation of the conventional electrode parts can be solved, and the sensitivity of the accelerometer can be enhanced.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
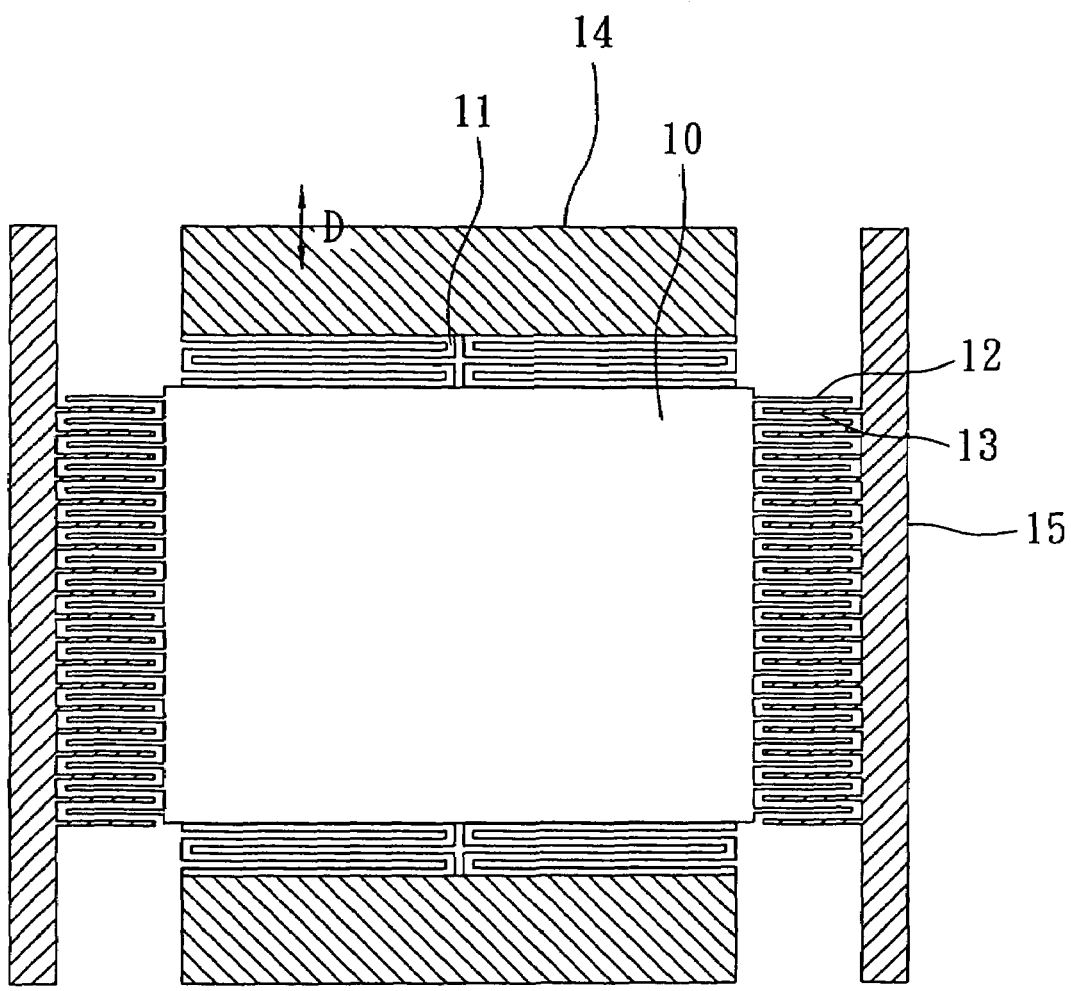
FIG. 1 is schematic view showing a conventional capacitance accelerometer.
Figure 2:
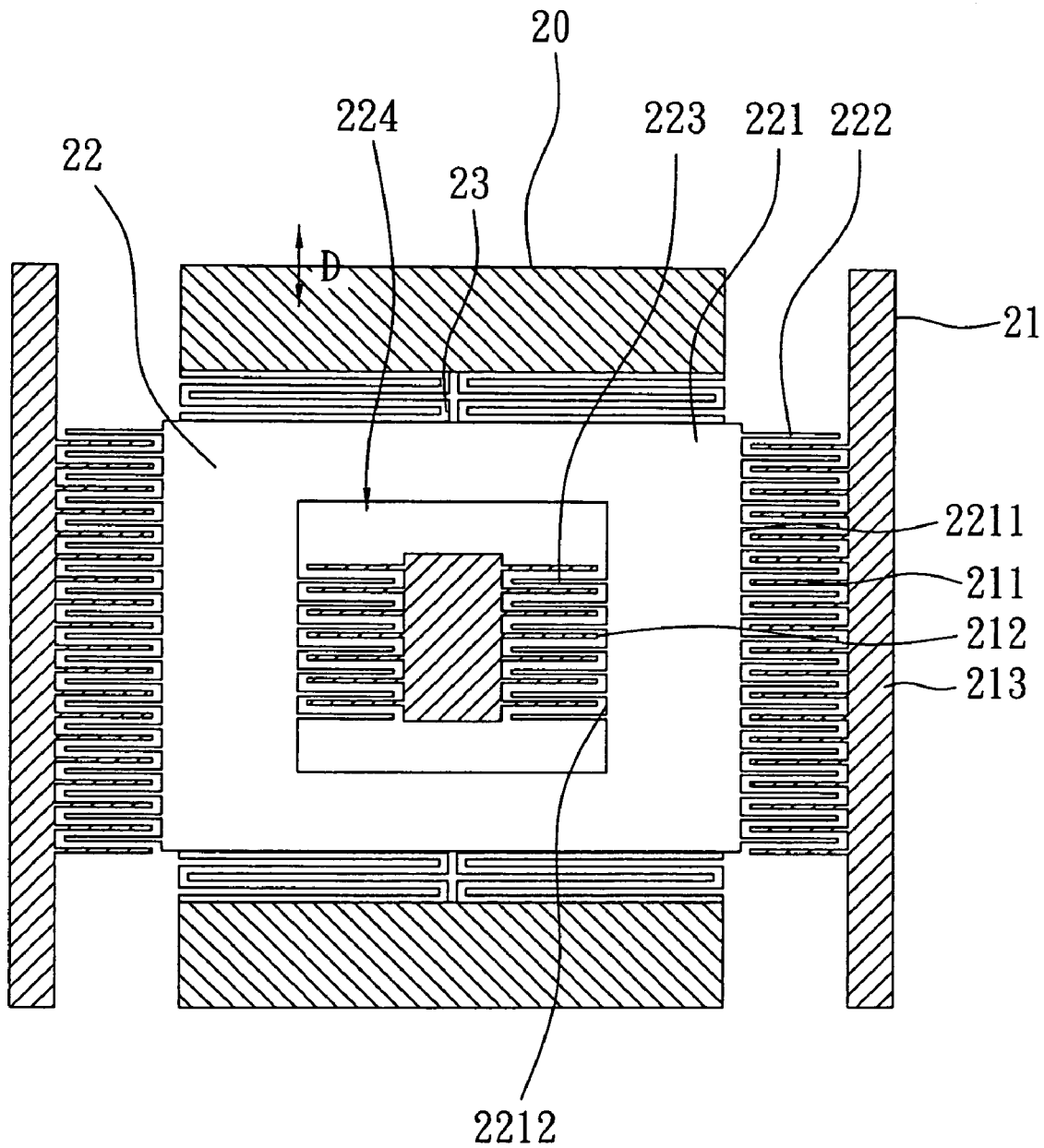
FIG. 2 is a schematic view showing an accelerometer according to the first embodiment of the invention.

With reference to FIG. 2, an accelerometer 2 according to the first embodiment of the invention includes a fixing unit 21 and a movable unit 22. In the embodiment, the accelerometer 2 is a capacitance accelerometer.

The movable unit 22 may be a proof mass, which is hanged on a fixing block 20. In more detail, both two sides of the movable unit 22 are connected with the fixing block 20 by an elastic element 23. If there is no external force, the movable unit 22 is supported by the elastic element 23 and stays at a static position. In this case, the elastic element 23 may be a spring or an elastic sheet.

The fixing unit 21 includes a substrate 213, a plurality of first electrode parts 211, and a plurality of second electrode parts 212. The first electrode parts 211 are arranged in parallel to form a comb structure. Also, the second electrode parts 212 are arranged in parallel to form a comb structure. To be noted, the first electrode parts 211 and the second electrode parts 212 are, preferable but not limited to, formed by an etching process, an electroforming process or an electrical discharge machining (EDM) process.

The movable unit 22 includes a body 221, a plurality of third electrode parts 222 and a plurality of fourth electrode parts 223. The third electrode parts 222 are arranged in parallel, and the fourth electrode parts 223 are also arranged in parallel. The body 221 has an opening 224, which is, for example but not limited to be, located at the center of the body 221. The third electrode parts 222 form a comb structure and are connected with the outer side 2211 of the body 221. In the embodiment, the third electrode parts 222 are disposed with respect to the first electrode parts 211 of the movable unit 22, respectively. The fourth electrode parts 223 are disposed in the opening 224 and are connected to the inner side 2212 of the body 221. Herein, the fourth electrode parts 223 are disposed with respect to the second electrode parts 212 of the fixing unit 21, respectively. As shown in FIG. 2, the first electrode parts 211 and the third electrode parts 222 are arranged interdigitatedly, and the second electrode parts 212 and the fourth electrode parts 223 are arranged interdigitatedly.

The first electrode parts 211 are electrically connected to a power source, and the third electrode parts 222 are electrically connected to a ground (not shown). The second electrode parts 212 are electrically connected to a power source, and the fourth electrode parts 223 are electrically connected to a ground (not shown). Accordingly, the first electrode parts 211 and the third electrode parts 222 can form a plurality of capacitance sensors, and the second electrode parts 212 and the fourth electrode parts 223 also form a plurality of capacitance sensors.

As mentioned above, when an external force is applied to the movable unit 22, the movable unit 22 moves along a direction D so that the distances between the first electrode parts 211 and the third electrode parts 222 and between the second electrode parts 212 and the fourth electrode parts 223 are changed. Thus, the capacitances between the first electrode parts 211 and the third electrode parts 222 and between the second electrode parts 212 and the fourth electrode parts 223 are changed. Then, the acceleration caused by the external force can be calculated according to the capacitance variation.

The arrangement of the first electrode parts 211, the second electrode parts 212, the third electrode parts 222, and the fourth electrode parts 223 in the above-mentioned embodiment is only an example. It is preferred to provide the first electrode parts 211 at both sides of the movable unit 22 so as to increase the sensitivity of the accelerometer under the condition of limited space. Besides, the first electrode parts 211 and the third electrode parts 222 disposed at two sides of the movable unit 22 may be arranged symmetrically or unsymmetrically. In the above-mentioned arrangements, the acceleration can be calculated according to the capacitance variation(s).

Figure 3:
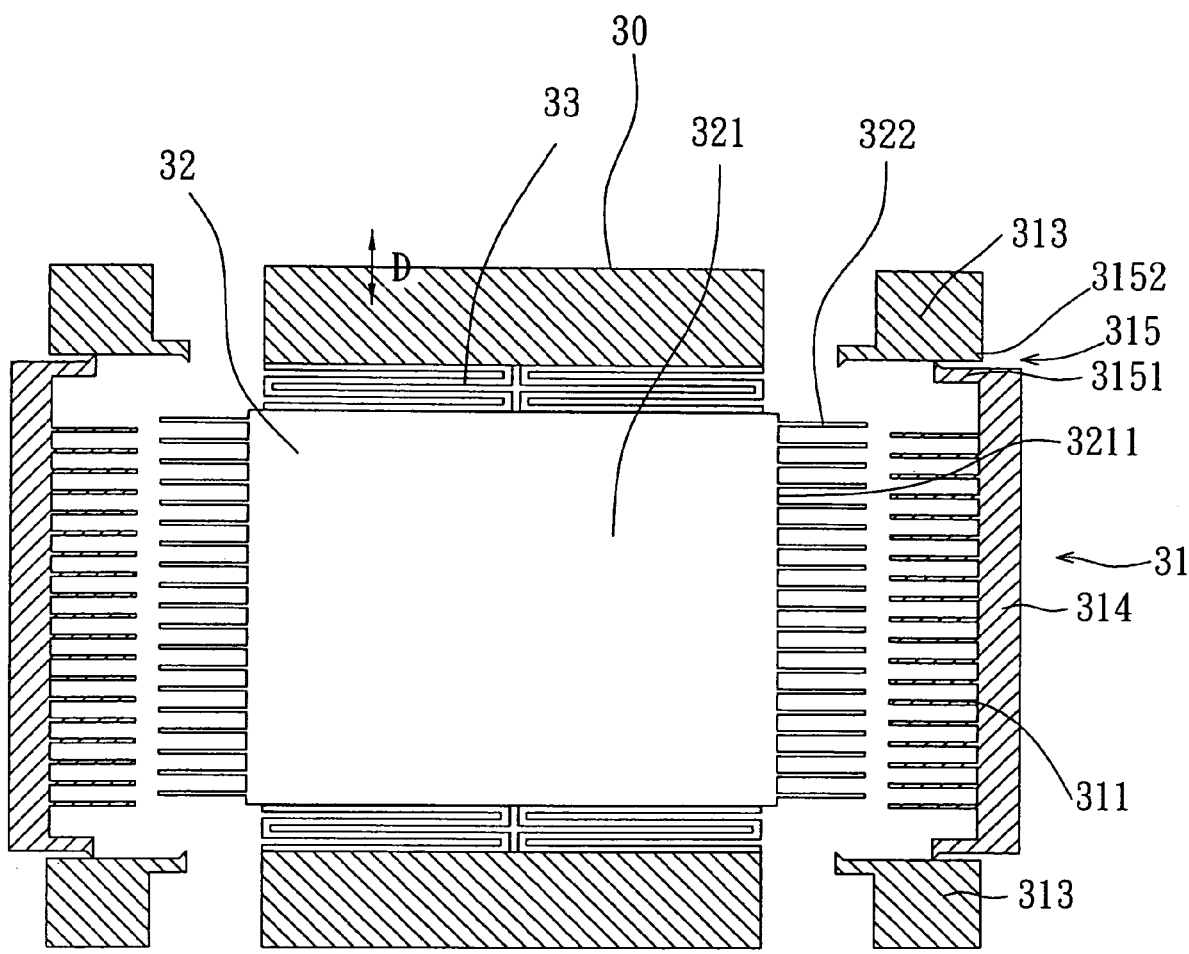
FIG. 3 is a schematic view showing an accelerometer according to the second embodiment of the invention, wherein the accelerometer has not been assembled.
Figure 4:
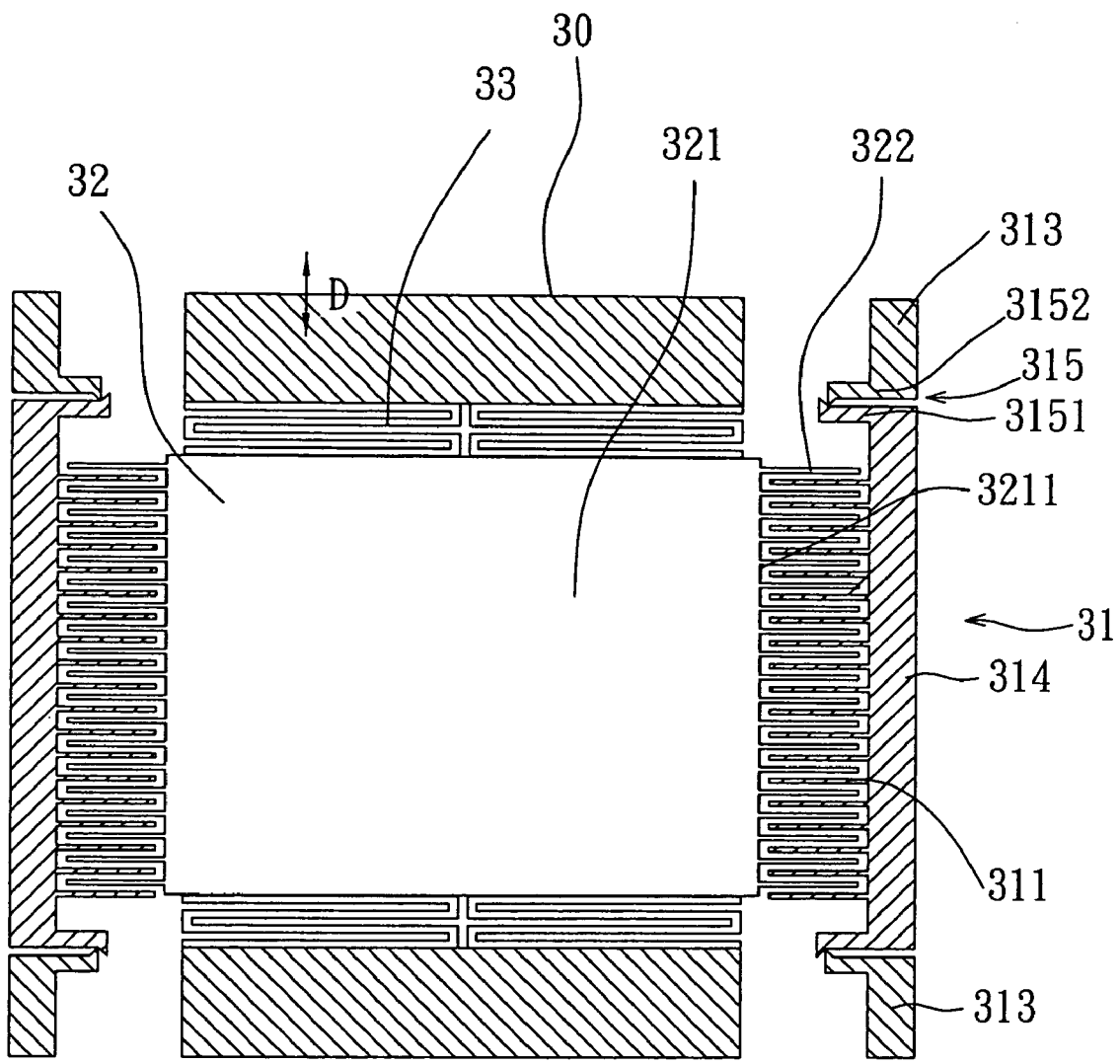
FIG. 4 is a schematic view showing an accelerometer according to the second embodiment of the invention, wherein the accelerometer is assembled.

Please refer to FIG. 3 and FIG. 4 showing the second embodiment of the invention. FIG. 3 is a schematic view showing an accelerometer, which has not been assembled. FIG. 4 is a schematic view showing the accelerometer, which is assembled. In this embodiment, an accelerometer 3 includes a fixing unit 31 and a movable unit 32. Herein, the accelerometer 3 is a capacitance accelerometer.

The movable unit 32, which is the similar to the movable unit 22 of the previous embodiment, is connected with the fixing block 30 by an elastic element 33. In the embodiment, the movable unit 32 includes a body 321 and a plurality of second electrode parts 322, which are arranged in parallel. The second electrode parts 322 are located at an outer side 3211 of the body 321.

The fixing unit 31 includes a substrate 313, a first conductive element 314, and a positioning structure 315. The first conductive element 314 has a plurality of first electrode parts 311, and the first conductive element 314 is disposed on the substrate 313 via the positioning structure 315 so as to allow the first electrode parts 311 and the second electrode parts 322 to be arranged interdigitatedly.

In the embodiment, the positioning structure 315 has a fastening part 3151 and an elastic part 3152. In more detail, the fastening part 3151 is connected with the first conductive element 314, and the elastic part 3152 is connected with the substrate 313. By wedging, locking, or connecting, the first conductive element 314 can be positioned on the substrate 313 precisely. Otherwise, the fastening part 3151 may be connected with the substrate 313, and the elastic part 3152 may be connected with the first conductive element 314. By this way, the first conductive element 314 and the substrate 313 may also connect to each other. The fastening part 3151 is preferably a pin.

The embodiment is to reduce the distances between the first electrode parts 311 and the second electrode parts 322 so as to enhance the sensitivity of the accelerometer. The accelerometer 3 is illustrated in FIG. 3, which shows the fixing unit 31 and the movable unit 32. As shown in FIG. 3, the first electrode parts 311 and the second electrode parts 322 have not to be arranged interdigitatedly, and the intervals of the first electrode parts 311 and the intervals of the second electrode parts 322 are larger than 5 μm so that the accelerometer 3 can be manufactured easily by the present etching process, electroforming process or electrical discharge machining (EDM) process. Then, the first conductive element 314 is moved toward the movable unit 32 by the positioning structure 315 so as to fix the corresponding positions of the first conductive element 314 and the substrate 313. As shown in FIG. 4, the distance between one of the first electrode parts 311 and adjacent one of the second electrode parts 322 is controlled to be under 1 μm. Therefore, the sensitivity of the accelerometer according to the embodiment is enhanced because of the smaller intervals of the coupled electrode parts.

In addition, the positioning structure 315 may include an adhering part (not shown) and an elastic part 3152. In this case, the adhering part can fix the first conductive element 314 as the above-mentioned example after the elastic part 3152 guides the first conductive element 314 toward the movable unit 32. Herein, the adhering part is such as glue and is applied by a glue dispenser. Alternatively, the adhering part is a solder. According to the above-mentioned methods, the first conductive element 314 can be connected to and well positioned on the substrate 313.

Figure 5:
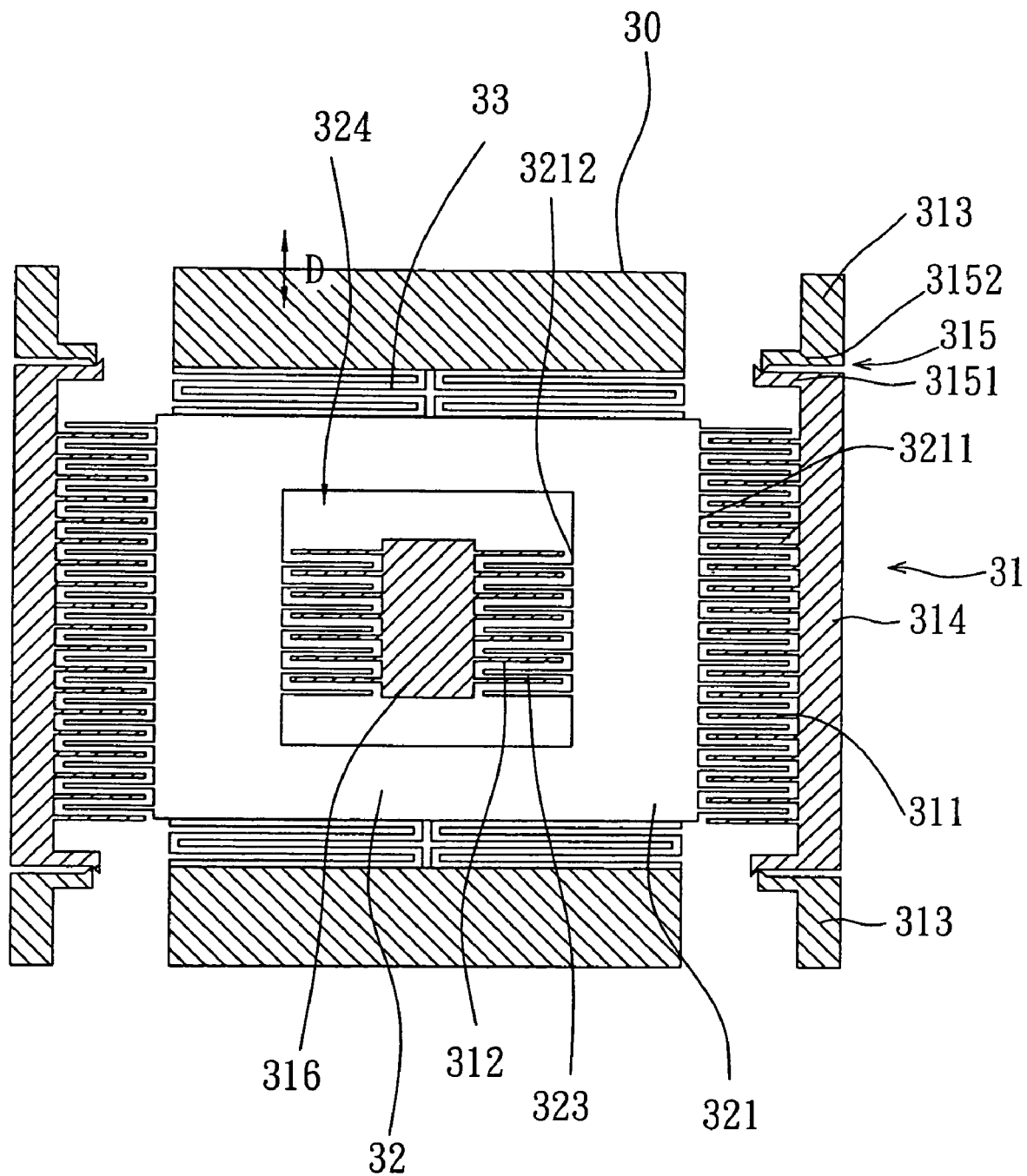
FIG. 5 is a schematic view showing another accelerometer according to the third embodiment of the invention.

As shown in FIG. 5, the body 321 of the movable unit 32 has an opening 324, and the movable unit 32 may further include a plurality of third electrode parts 323, which are located at an inner side 3212 in the opening 324 with respect to the outer side 3211. The fixing unit 31 may further include a second conductive element 316, which has a plurality of fourth electrode parts 312 disposed respectively with respect to the third electrode parts 323. The third electrode parts 323 and the fourth electrode parts 312 are arranged interdigitatedly.

As mentioned above, the second conductive element 316 is fixed on one side of the fixing unit 31, so that the second conductive element 316 and the fixing unit 31 have no relative motion. The fourth electrode parts 312 and the third electrode parts 323 are arranged interdigitatedly. In this case, the distance between one of the third electrode parts 323 and adjacent one of the fourth electrode parts 312 is not greater than 1 µm. Therefore, the sensitivity of the accelerometer according to the embodiment is enhanced due to the smaller intervals of the coupled electrode parts and the increased number of electrode parts. The element structures, functions, and features of the positioning structure of this embodiment are the same as those described above, so the detailed descriptions are omitted.

The connection and arrangement of the fixing unit 31 and the movable unit 32 are the same as those described above. The constructions and functions of the substrate 313, the first electrode parts 311, the body 321, the second electrode parts 322, the third electrode parts 323, and the fourth electrode parts 312 of this embodiment are the same as the substrate 213, the first electrode parts 211, the body 221, the third electrode parts 222, the fourth electrode parts 223, and the second electrode parts 212 of the previous embodiment, so the detailed descriptions are omitted.

In summary, the invention is to provide an opening on the body of the movable unit (the proof mass). The electrode parts (the comb electrodes) may not only be disposed at the outer side of the body, but also be disposed at the inner side of the body in the opening corresponding to the outer side. Thus, the number of the electrode parts can be increased so as to enhance the sensitivity of the accelerometer. Compared to the prior art, the invention provides the opening for disposing additional electrode parts so that the accelerometer of the invention would not be manufactured against the trend of product minimization. In addition, the electrode parts of the fixing unit are disposed on one conductive element, which is connected with the substrate by the positioning structure, so the electrode parts of the fixing unit are disposed with respect to the electrode parts of the movable unit. In other words, each of the electrode parts of the fixing unit is disposed between two of the electrode parts of the movable unit, and the positioning structure of the invention can lead to the coupled electrode parts with smaller intervals. Accordingly, the distance limitation of the conventional electrode parts can be solved, and the sensitivity of the accelerometer can be enhanced.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An accelerometer, comprising:
    a fixing unit comprising a plurality of first electrode parts and a plurality of second electrode parts; and
    a movable unit connected with the fixing unit and comprising a body, a plurality of third electrode parts and a plurality of fourth electrode parts, wherein the body has an opening, the third electrode parts are located at an outer side of the body and are disposed respectively with respect to the first electrode parts, and the fourth electrode parts are located in the opening and are disposed respectively with respect to the second electrode parts,
    wherein a plurality of capacitance sensors formed by the first electrode parts and the third electrode parts and a plurality of capacitance sensors formed by the second electrode parts and the fourth electrode parts sense an acceleration.

2. The accelerometer of claim 1, wherein the movable unit is connected with a fixing block by an elastic element.

3. The accelerometer of claim 2, wherein the elastic element is a spring or an elastic sheet.

4. The accelerometer of claim 1, wherein the first electrode parts and the third electrode parts are arranged interdigitatedly, and a distance between one of the first electrode parts and adjacent one of the third electrode parts is not greater than 1 µm.

5. The accelerometer of claim 1, wherein the second electrode parts and the fourth electrode parts are arranged interdigitatedly, and a distance between one of the second electrode parts and adjacent one of the fourth electrode parts is not greater than 1 µm.

6. The accelerometer of claim 1, wherein the fixing unit comprises a substrate, a conductive element and a positioning structure, the first electrode parts or the second electrode parts are disposed on the conductive element, and the conductive element is separable from the substrate, and the conductive element is fixedly positioned on the substrate by the positioning structure.

7. The accelerometer of claim 6, wherein the positioning structure comprises a fastening part and an elastic part, the fastening part is on the conductive element while the elastic part is on the substrate, or the fastening part is on the substrate while the elastic part is on the conductive element, the fastening part is a pin, and the elastic part is a spring or an elastic sheet.

8. The accelerometer of claim 6, wherein the positioning structure includes an adhering part and an elastic part, and the adhering part is located on the conductive element while the elastic part is located on the substrate, or the adhering part is located on the substrate while the elastic part is located on the conductive element.

9. The accelerometer of claim 1, wherein the accelerometer is a capacitance accelerometer.

10. An accelerometer, comprising:
    a fixing unit comprising a substrate, a first conductive element, and a positioning structure, wherein the first conductive element has a plurality of first electrode parts, and the first conductive element is separable from the substrate and the first conductive element is fixedly positioned on the substrate by the positioning structure; and a movable unit connected with a fixing block and comprising a body and a plurality of second electrode parts, wherein the second electrode parts are located at an outer side of the body and are disposed respectively with respect to the first electrode parts.

11. The accelerometer of claim 10, wherein the positioning structure includes a fastening part and an elastic part, the fastening part is on the conductive element while the elastic part is on the substrate, or the fastening part is on the substrate while the elastic part is on the conductive element, the fastening part is a pin, and the elastic part is a spring or an elastic sheet.

12. The accelerometer of claim 11, wherein the positioning structure includes an adhering part and an elastic part, and the adhering part is located on the conductive element while the elastic part is located on the substrate, or the adhering part is located on the substrate while the elastic part is located on the conductive element.

13. The accelerometer of claim 10, wherein the first electrode parts and the second electrode parts are arranged interdigitatedly, and a distance between one of the first electrode parts and adjacent one of the second electrode parts is not greater than 1 μm.

14. The accelerometer of claim 10, wherein the body of the movable unit has an opening, and the movable unit further includes a plurality of third electrode parts located at an inner side of the body in the opening.

15. The accelerometer of claim 14, wherein the fixing unit further includes a second conductive element, and the second conductive element has a plurality of fourth electrode parts disposed with respect to the third electrode parts, respectively.

16. The accelerometer of claim 14, wherein the third electrode parts and the fourth electrode parts are arranged interdigitatedly, and a distance between one of the third electrode parts and adjacent one of the fourth electrode parts is not greater than 1 μm.

17. The accelerometer of claim 10, wherein the accelerometer is a capacitance accelerometer.

* * * * *